No. 717,067. Patented Dec. 30, 1902.
G. F. BRANDAU.
BRAKE MECHANISM.
(Application filed June 30, 1902.)
(No Model.) 3 Sheets—Sheet 1.
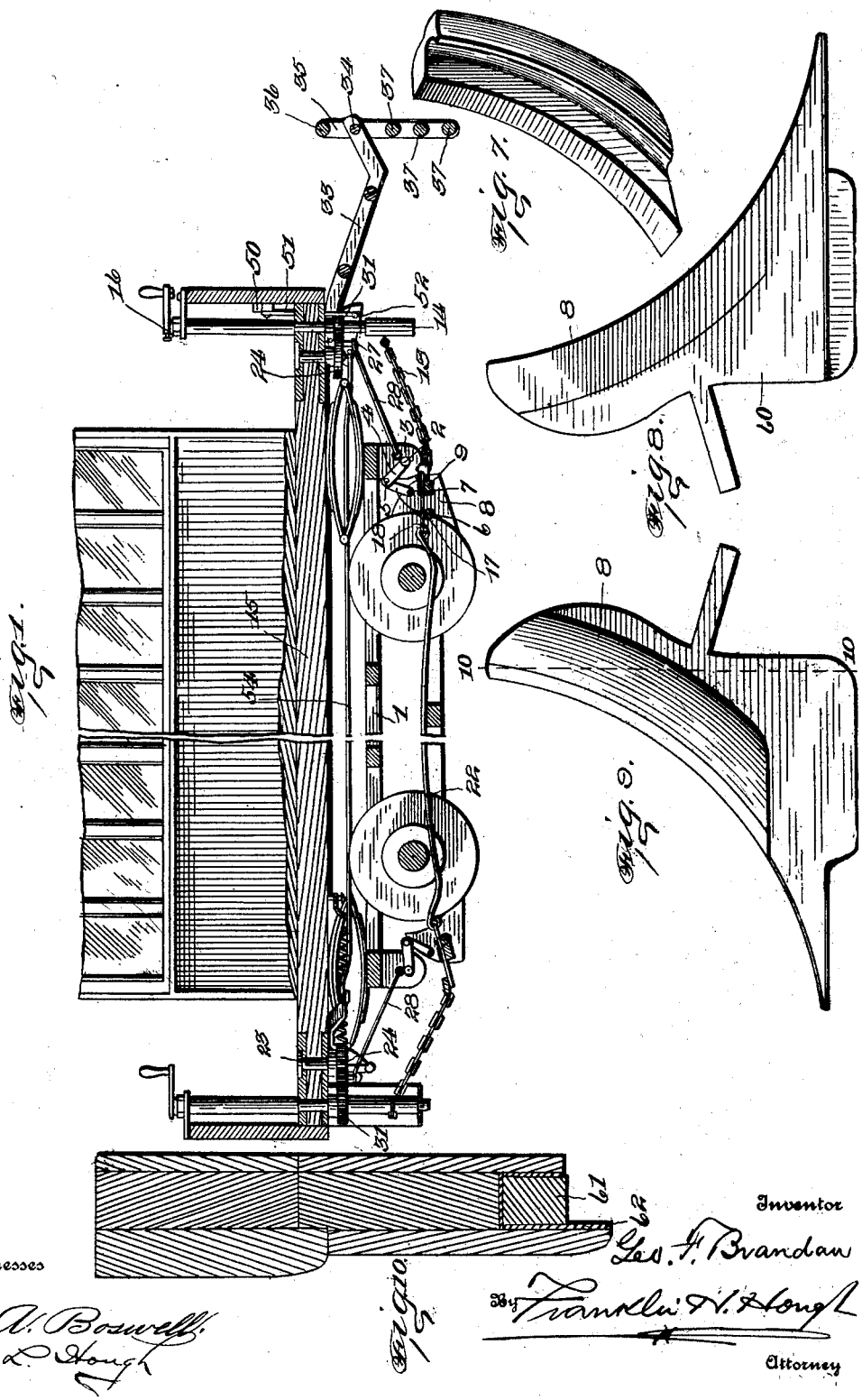

No. 717,067. Patented Dec. 30, 1902.
G. F. BRANDAU.
BRAKE MECHANISM.
(Application filed June 30, 1902.)
(No Model.) 3 Sheets—Sheet 2.
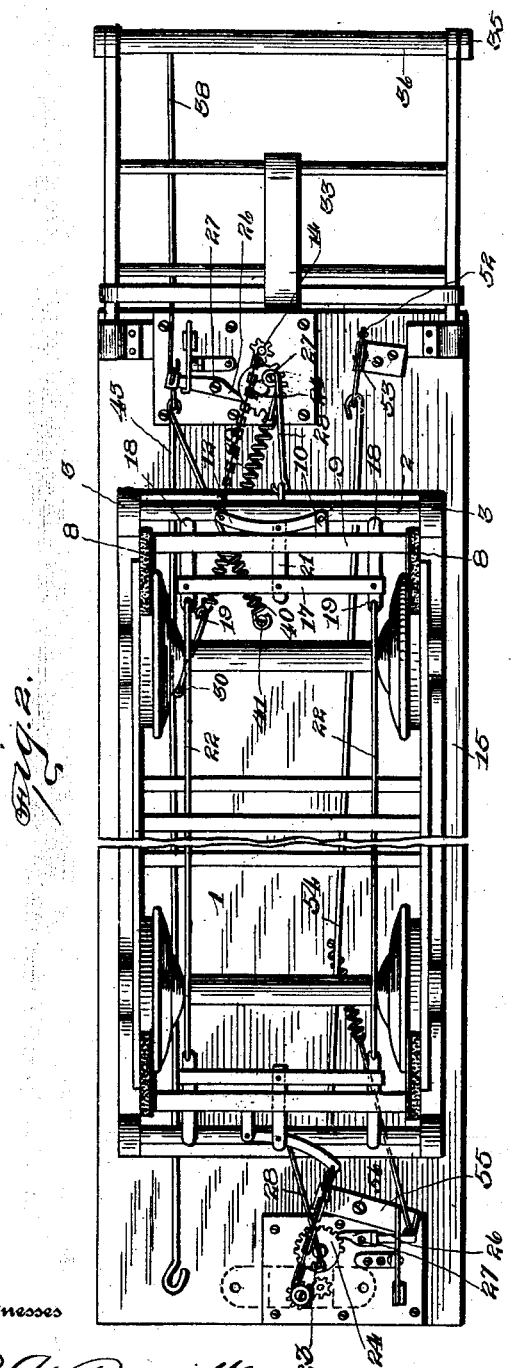
Witnesses
P. A. Boswell
A. L. Hough
Inventor
George F. Brandau,
By Franklin H. Hough
Attorney No. 717,067. Patented Dec. 30, 1902.
G. F. BRANDAU.
BRAKE MECHANISM.
(Application filed June 30, 1902.)
(No Model.) 3 Sheets—Sheet 3.
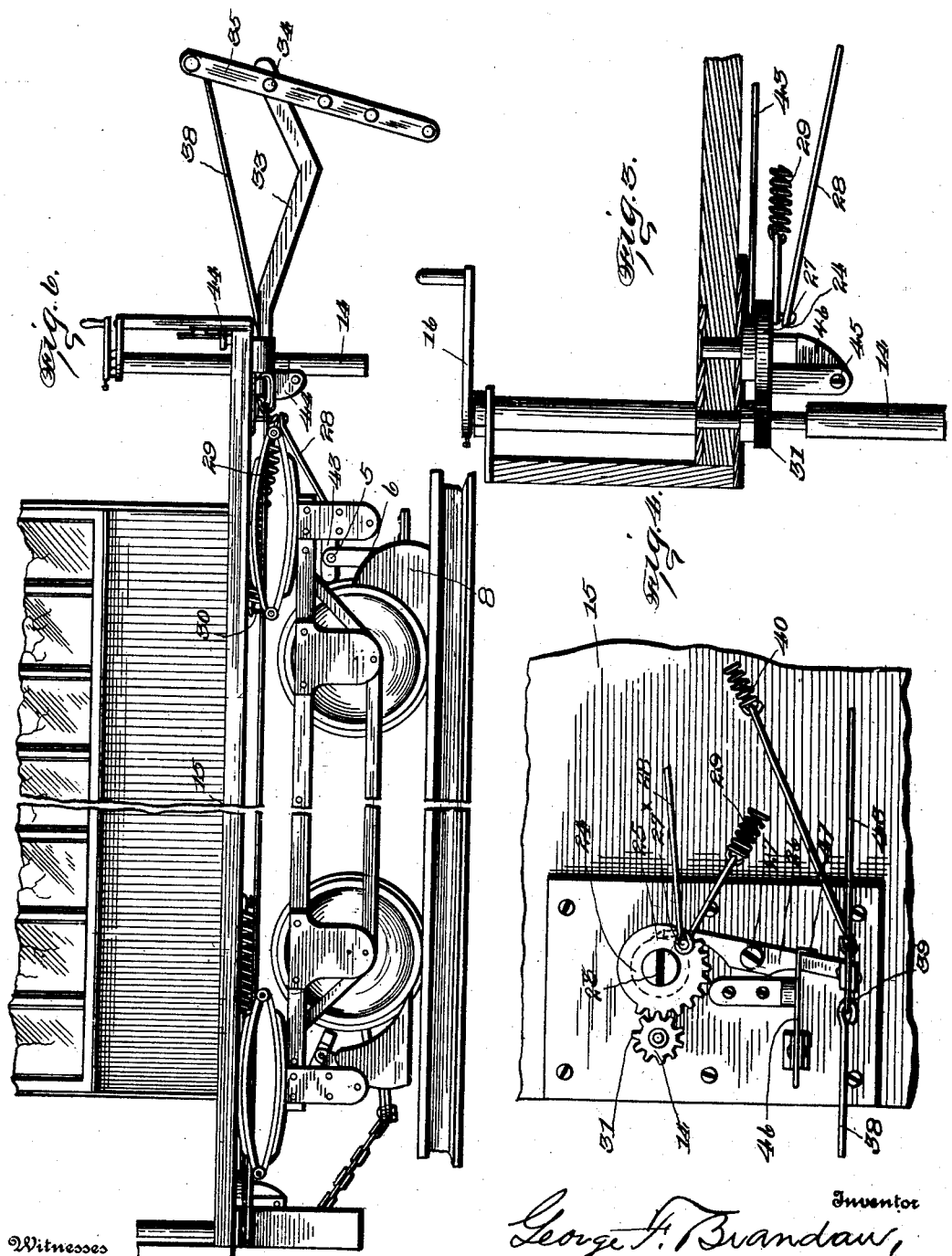

UNITED STATES PATENT OFFICE.

GEORGE FRIEDRICH BRANDAU, OF UTICA, NEW YORK.

BRAKE MECHANISM.

SPECIFICATION forming part of Letters Patent No. 717,067, dated December 30, 1902.

Application filed June 30, 1902. Serial No. 113,737. (No model.)

*To all whom it may concern:*

Be it known that I, GEORGE FRIEDRICH BRANDAU, a citizen of the United States, residing at Utica, in the county of Oneida and State of New York, have invented certain new and useful Improvements in Brake Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in automatically-operated brakes used in connection with a life-guard or fender operated independent of the same by means of suitable mechanism, means being provided whereby the brake-shoes may be operated in the ordinary manner by means of winding-posts and chain and lever connections and also mechanism being provided whereby the brake-shoes may be dropped from suspended positions, so as to throw the brake-shoes underneath the rear wheels of the car in case of an emergency, when said shoe is adapted to have a wedging action between the wheels and the rail.

The invention consists, further, in various details of construction and combinations and arrangements of parts, as will be hereinafter more fully described and then specifically defined in the appended claims.

My invention is clearly illustrated in the accompanying drawings, which, with the letters of reference marked thereon, form a part of this application, and in which—

Figure 1 is a longitudinal sectional view through a car equipped with my improved brake mechanism and fender, parts being shown in side elevation. Fig. 2 is a bottom plan view of a truck, showing connections comprising the details of my brake mechanism. Fig. 3 is vertical sectional view through the platform of a car, showing in elevation various features of my invention. Fig. 4 is a bottom plan view, on an enlarged scale, showing the means for releasing the brake-supporting mechanism. Fig. 5 is an enlarged perspective view of a set of brake-shoes and lever-operating mechanism connected therewith. Fig. 6 is a side elevation of a car equipped with my improved brake mechanism, showing the forward brake thrown in its lowest position and the rear brake held in suspension. Fig. 7 is an enlarged detail view of one section of the brake-shoe. Fig. 8 is a side elevation of the brake-shoe. Fig. 9 is a view of the reverse side of the brake-shoe, and Fig. 10 is a cross-sectional view on line 10 10 of Fig. 9.

Reference now being had to the details of the drawings by numerals, 1 designates the truck of a car, in which the running-gear is mounted in the usual way, and 2 designates a shaft which is mounted in suitable bearings 3, carried by the truck, and projecting from said shaft are arms 4, which have perforated ends, and each is adapted to receive a pin 5, carried by a link 6, which link is pivotally connected to a pin 7, carried by the brake-shoe 8. Said brake-shoes are connected by a cross-piece 9 and rigidly held thereto in any suitable manner. Projecting from one face of said cross-piece 9 is an arm 10, carrying a pivotal pin 11 at its end on which a lever 12 is pivoted, which lever has chain connections 13 with the brake-post 14, which is journaled in suitable bearings in an aperture in the platform 15 of the car and has removably held at its upper end an operating-crank 16. Referring to the bottom plan view, it will be observed that a rod or bar 17 has arms 18, one of which is fastened to each end of said bar and has corresponding inner ends, perforated, as at 19, while its other ends are adapted to have a reciprocating movement in apertures 20 in said cross-piece 9. Fastened to the middle of said rod or bar 17 is a link 21, which passes through a central slot in the cross-piece 9 and has pivotal connection at its outer end with the lever 12. It will be noticed upon observation of the construction illustrated in the bottom plan view that each set of wheels is provided with a set of brake-shoes and mechanism for operating the same which are identical in construction and that the inner apertured ends of the arms 18 are connected together by means of rods 22, whereby when an operator rotates the brake-post to apply the brake-shoes both sets of brakes on each pair of wheels will be operated.

The brake-shoes are held in their suspended positions for the purpose of being operated for ordinary use by the following mechanism: Mounted on a pivotal pin 23, secured one at each end of the car at the under surface thereof, is a segment gear-wheel 24, which has a shouldered portion carrying a pin 25, which pin is adapted to be engaged by a pivotal dog 26, mounted on a pivotal pin 27, carried on the under surface of the floor of the platform, and said segment gear-wheel carries a pin 27×, to which one end of a link 28 is pivotally connected, the other end of which link is connected to an eye carried by the shaft 2. A spring 29 is connected at one end to said pin carried by the segment gear-wheel, while its other end is connected to a stationary pin 30, fastened to the under surface of the bottom of the car. Keyed to the winding-brake post is a pinion 31, which is in mesh with the teeth of said segment-wheel when the brake-shoes are at their lowest limit; but when the brake-shoes are used for ordinary purposes of stopping the car said teeth are out of engagement with the teeth of the gear, and said brake-post is adapted to be rotated independent of the segment-gear for the purpose of applying the brakes. By turning the brake-post when the pinion carried thereby is in engagement with the teeth of the segment-wheel it will be noted that the latter will be given a partial rotation sufficient to cause the link carried by the pin, which is in turn carried by the segment-wheel, to cause the shaft 2 to rock sufficiently to raise and hold the brake-shoes in their suspended positions and in positions from which they may be operated for their ordinary use. As the shoes are raised by the rotation of the segment-gear it will be observed that the springs which are connected to the segment-gears will be under tension, and the dog engaging the pin carried on the shoulder of said segment-gear will cause the shoes to be held in said raised positions.

Mounted on the platform of the car is a fender-frame 33, carrying pivotal pins 34, to which a fender 35 is pivotally mounted. Said fender has a rod 36, which connects the upper ends of the end strips of the fender, while strips 37 are mounted intermediate the lower portions of the cross-pieces of the fender and project downward and are adapted to be so positioned that an obstruction upon the tracks will contact against the lower portion of the fender for the purpose of tilting the same upon its pivotal pin. 38 designates a rod which is connected at one end to the rod interposed between the upper ends of the cross-pieces of the fender, and its other end is connected to an eye 39, which is carried by said dog. A spring 40 is connected also to an eye carried by said dog, and its other end is fastened to a pin 41, secured to the bottom of the car, the office of said spring being to normally hold the dog in engagement with the pin carried on the shouldered portion of the segment-gear. Also secured to the eye to which said spring is connected is a rod 43, the end of which carries a hook which may be connected with and adapted to actuate a similarly-arranged releasing mechanism, which may be placed upon the end of an adjacent car, but which is not shown. By this connection of the releasing-pawl with the fender it will be noted that when the lower portion of the fender is tilted toward the platform of the car by an obstruction the upper portion of the fender will be tilted forward, which will cause the rod connected thereto to pull upon the spring-actuated dog and release the same from the pin carried by the segment-gear, after which the spring which is connected to a pin on the segment-gear will cause the latter to rotate, and through its connections with the shaft 2 the latter will rock in its bearings and cause the shoes carried by the cross-piece 9 to fall upon the track intermediate the same and the wheels, thus serving as an emergency brake.

In order to drop the emergency brake in positions described at other times than when the mechanism is actuated by the fender coming into contact with an obstruction, I provide a push bar or rod for operation by the foot of an operator, said push-bar being designated in the drawings by figure 44, and pivotally mounted on a post carried on the under surface of the platform is a pin 45, on which is mounted an angle-lever 46 to oscillate in a vertical plane, one end of which is disposed underneath said push bar or post, while an arm 47 is bent so as to engage the inner edge of the dog between its pivotal point and its outer end, whereby when an operator applies pressure to the push-bar said angle-lever will tilt upon its pivot and said arm will be oscillated to cause the free end of the dog to be released from the pin upon the gear 24 and allow the brake-shoes to fall to positions where there will be a wedging action of the brakes between the tracks and the wheels.

For the purpose of allowing the emergency-brake shoes to fall down upon the track and against the rear end of the car in case the latter should be going down an incline backward I provide the following means, consisting of a lever 50, pivoted to the dashboard of a platform, which lever is pivoted to a rod 51, fastened to the platform of a car and is pivoted to a rocking plate 52, which plate is pivotally mounted on a plate 53, carried by a bracket on the under surface of the platform. Connected to said plate is a rod 54, the opposite end of which is connected to a rocking bar 55, pivotally mounted at 56 on a pin near the rear end of the car. One end of said pivoted bar is preferably angled and is positioned normally adjacent to a spring-actuated dog which is adapted to hold the segment-wheel, and as an operator depresses on said tilting lever on the dashboard the angled end of the tilting member will be thrown against said dog and cause its free end to be thrown out of engagement with the pin carried by the adjacent segment-wheel and the latter will be allowed to rotate and the shoes connected thereto will fall under the forward portion of the wheels and have a wedging action between the same and the track, which will be readily understood.

Upon reference to Figs. 7 to 10, inclusive, it will be observed that my brake-shoe is made up of sections, one of which portions (designated by numeral 60) is channeled out on its under surface to receive a frictional brake-block 61, (shown in Figs. 5 and 10 of the drawings,) which block is made, preferably, of emery or other suitable material and adapted to have a secure frictional contact with the surface of the rail, and an insulation 62 is provided about said block 61. By the provision of this particular construction of brake-shoe it will be observed that when the latter is thrown to its lowest position into a wedging relation between the wheel and the track the concaved portion of the shoe will have a tendency to be crowded underneath the wheel, and consequently cause the wheel to be raised slightly from the track and shut off ground connection of the current. By reason of the provision of a shoe made in accordance with my invention I can easily replace the friction-blocks that may become worn or other parts of the brake-shoe, as will be readily understood.

From the foregoing it will be observed that an emergency brake made in accordance with my invention will be simple in construction and efficient in operation, the brake-shoes always being in readiness to be instantly applied when the fender strikes an obstruction or for other emergency purposes when the mechanism is actuated by an operator upon the platform.

Having thus fully described my invention, what I claim as new, and desire to secure by Letters Patent, is—

1. A brake mechanism comprising brake-shoes, means for holding the same suspended, a segment-gear, link connections between said gear and the brake-shoe mechanism, and means for rotating said segment-gear, a fender, and mechanism actuated thereby for releasing said segment-gear to allow said shoes to fall by gravity, as set forth.

2. A brake mechanism comprising brake-shoes, a rocking shaft, arms thereon, pivotal connections between the same and said shoes, a segment-gear, means for rotating the same, link connections between said rock-shaft and segment-gear, a spring fixed at one end and fastened at the other end to the segment-gear, a tilting fender, and means actuated thereby for releasing and allowing said segment-gear to rotate, whereby the brake-shoes will be lowered to assume positions between the track and wheels of the truck, as set forth.

3. A brake mechanism comprising brake-shoes, a rock-shaft, pivotal connections between the same and said shoes, the segment-gear journaled on the platform of a car, link connections between the same and said rock-shaft, a winding-post, a pinion mounted thereon and adapted to mesh with said segment-gear, a spring fixed at one end and connected to the segment, a spring-actuated dog adapted to hold said segment-gear from rotation, a tilting fender and connections between the same and the dog, whereby the segment-gear is released to allow the shoes to fall by gravity, as set forth.

4. A brake mechanism comprising brake-shoes, a rock-shaft, pivotal connections between the same and said shoes, a segment-gear, link connections between the same and said rock-shaft, a spring fixed at one end to the floor of a car and at its other end fastened to the segment-gear, a winding-post, a pinion connected thereto and meshing with the segment-gear, a spring-actuated dog, a pin carried on the shoulder of the segment-gear and adapted to be engaged by said gear, a fender, connections between the same and the dog, whereby as the fender tilts, the segment-gear is released and the brake-shoes are allowed to fall, as set forth.

5. A brake mechanism comprising brake-shoes, a rock-shaft, pivotal connections between the same and said shoes, a segment-gear, link connections between the same and said shaft, a spring fixed at one end to the floor of the car and at its other end fastened to said gear, a winding post or shaft, a pinion thereon in mesh with said gear, a pivoted dog, a pin on the segment-gear engaged by said dog, a fender-frame, a tilting fender mounted thereon, and a rod connected to the upper end of said tilting fender, and at its other end fastened to said dog, as set forth.

6. In combination with brake-shoes, a rock-shaft having pivotal connections therewith, a segment-gear, link connections between the same and said shaft, a spring fastened at one end to the floor of the car and at its other end fastened to the gear, a winding-post, a pinion thereon designed to mesh with said gear, whereby the brake-shoes may be raised and be held in suspended positions, a pivoted dog, a pin carried by the segment-gear and engaged by said dog, a push-bar, an angle-lever mounted underneath the car and actuated by said push-bar, an arm on said angle-lever adapted to rest adjacent to said dog, and a rod actuated by said dog, and a spring for normally holding the dog in engagement with the pin on said gear, as set forth.

7. In combination with brake-shoes, a cross-piece connecting the same, a lever pivoted on arms carried by said cross-piece, a rod 17, link connections between the same and said lever, arms on said lever extending through said cross-piece, a winding-post, chain connections between the same and said lever, and rods fastened to said arms and adapted to actuate a similarly-constructed brake mechanism adjacent to the trucks at the rear end of the car, as set forth.

8. In combination with brake-shoes mounted at the rear end of a car, a cross-piece on which they are held, a rock-shaft, connections between the same and said cross-piece, the segment-gear at the rear end of the car, the winding-post, the pinion mounted thereon and in connection with said gear, link connections between the latter and said gear, a spring secured at one end to the floor of the car and at its other end to the gear, a lever pivoted to the dashboard at the forward end of the car, a rocking plate underneath the floor of the car, link connections between said plate and rocking lever, a pivot-bar at the opposite end of the car, rod connections between the same and said rocking plate, a spring-actuated dog adapted to hold said segment-gear and against which said pivot-bar is adapted to bear as an operator depresses said lever, whereby the brake-shoes on the rear wheels of the car may be lowered, as set forth.

9. In a brake mechanism, the brake-shoes, means for supporting the same, each shoe made up of sections, and grooved in its under surface, a frictional block mounted in said groove, and insulating material about said block, and means for throwing the shoe so as to assume a wedging relation between a wheel of a car-truck and a railway-rail, as set forth.

In testimony whereof I affix my signature in presence of two witnesses.

GEORGE FRIEDRICH BRANDAU.

Witnesses:
FRED P. WAGNER,
WENDELIN J. BACH.